(12) United States Patent
Oettle et al.

(10) Patent No.: US 8,696,260 B2
(45) Date of Patent: *Apr. 15, 2014

(54) TOOL FOR MACHINING, IN PARTICULAR LONGITUDINAL TURNING TOOL

(75) Inventors: Matthias Oettle, Riederich (DE); Uli Ruoff, Dusslingen (DE)

(73) Assignee: Hartmetall-Werkzeugfabrik Paul Horn (DE)

( * ) Notice: Subject to any disclaimer, the term of this patent is extended or adjusted under 35 U.S.C. 154(b) by 738 days.

This patent is subject to a terminal disclaimer.

(21) Appl. No.: 12/818,596

(22) Filed: Jun. 18, 2010

(65) Prior Publication Data

US 2011/0142556 A1    Jun. 16, 2011

Related U.S. Application Data

(63) Continuation of application No. PCT/EP2008/009965, filed on Nov. 25, 2008.

(30) Foreign Application Priority Data

Dec. 19, 2007  (DE) .......................... 10 2007 063 199

(51) Int. Cl.
*B23B 27/16* (2006.01)
*B23B 27/00* (2006.01)

(52) U.S. Cl.
USPC ........................................... 407/103; 407/48

(58) Field of Classification Search
USPC .............................. 407/48, 103; 408/153, 179
See application file for complete search history.

(56) References Cited

U.S. PATENT DOCUMENTS

| 1,416,843 | A | * | 5/1922 | Labonte ......................... 407/69 |
| 1,629,667 | A | * | 5/1927 | Knipple ......................... 407/103 |
| 3,546,759 | A | * | 12/1970 | Sirola ............................. 407/73 |
| 5,976,455 | A | * | 11/1999 | Pantzar et al. ................. 419/14 |
| 7,322,777 | B2 | * | 1/2008 | Jager et al. .................... 408/153 |
| 7,445,410 | B2 | * | 11/2008 | Abramson et al. ............ 408/154 |
| 2004/0028492 | A1 | | 2/2004 | Jager et al. |
| 2012/0009030 | A1 | * | 1/2012 | Oettle et al. .................. 407/103 |

FOREIGN PATENT DOCUMENTS

| DE | 2-736-387 A1 | 2/1979 |
| DE | 3-305-832 A1 | 8/1984 |
| DE | 38-10-259 A1 | 10/1989 |

(Continued)

*Primary Examiner* — Will Fridie, Jr.
(74) *Attorney, Agent, or Firm* — Saliwanchik, Lloyd & Eisenschenk

(57) ABSTRACT

The present invention relates to a tool for machining a workpiece, comprising a tool body, a cutting tool, and fastening means for fastening the cutting tool in a receiving recess of the tool body, the cutting tool having a cutting edge and a cutting-tool through-bore, and the tool body having a tool-body through-bore that opens into the receiving recess, wherein the fastening means comprises a clamping bushing that is provided with an internal thread, and comprises a clamping screw that is provided with an external thread corresponding to the internal thread of the clamping bushing, which are inserted into the cutting-tool bore or into the tool-body bore from opposing sides in order to fasten the cutting tool to the tool body, the clamping bushing is screwed directly to the clamping screw, irrespective of whether it is inserted into the cutting-tool bore or into the tool-body bore, and anti-rotation means are provided to prevent the clamping bushing from rotating about its longitudinal axis when being screwed and undone by means of the clamping screw.

19 Claims, 4 Drawing Sheets

(56) References Cited

FOREIGN PATENT DOCUMENTS

| | | |
|---|---|---|
| DE | 10-047-079 A1 | 4/2002 |
| DE | 20-2005-012-862 U1 | 12/2006 |
| GB | 1-254-578 A | 11/1971 |
| WO | WO-03-074217 | 9/2003 |

* cited by examiner

TOOL FOR MACHINING, IN PARTICULAR LONGITUDINAL TURNING TOOL

CROSS-REFERENCE TO RELATED APPLICATIONS

This is a continuation application of International patent application PCT/EP2008/009965, filed Nov. 25, 2008, designating the United States and published as WO 2009/077060 A1, which claims priority to German application no. 10 2007 063 199.7, filed on Dec. 19, 2007, both of which are hereby incorporated by reference herein in their entirety, including any figures, tables, or drawings.

FIELD OF THE INVENTION

The present invention relates to a tool for machining a workpiece, comprising a tool body, a cutting tool, and fastening means for fastening the cutting tool in a receiving recess of the tool body, the cutting tool having a cutting edge and a cutting-tool through-bore, and the tool body having a tool-body through-bore that opens into the receiving recess. The present invention relates, in particular, to a longitudinal turning tool.

BACKGROUND OF THE INVENTION

In the case of known tools, the cutting tool, for example a cutting bit, is fastened in the receiving recess of the tool body in that an internal thread is provided in the tool-body bore. A fastening screw having a corresponding external thread engages in this internal thread, which fastening screw engages from the outside, first through the cutting-tool bore in the cutting tool, and then into the tool-body bore, and is then screwed tight. However, in the case of automated longitudinal turners, in which such tools, so-called longitudinal turning tools, are frequently used, there is often little space available for replacing the cutting tool, which is a wearing part and has to be changed frequently, while the tool body remains clamped into the machine tool. Since, in the case of the known tools, the screw by which the cutting tool is fastened to the tool body is accessible only from one side, however, in order to change the cutting tool it is therefore often necessary to remove the entire tool from the machine tool and to refit it after the cutting tool has been changed. This is very time-consuming, and is to be prevented according to the invention.

A tool wherein the fastening means for fastening the cutting tool to a tool body are accessible from two opposing sides, and wherein the problem described above has already basically been solved, is known from WO 2003/074217. In that case, a special fastening element is used to fasten the cutting tool to the tool body, which fastening element has, at its front end, special screw-shaped clamping wings, which act together with corresponding support wings within the cutting-tool bore, in the manner of a thread. In this case, screwing the fastening element into the cutting-tool bore causes the cutting tool to be fastened to the tool body, although the fastening element for tightening or undoing from both sides can be turned by means of differing keys.

SUMMARY OF THE INVENTION

The present invention is based on the object of presenting a tool, having an exchangeable cutting tool, which enables the fastening means to be tightened or undone from differing sides, wherein, however, the fastening means are of simple design, and wherein the same auxiliary tool can always be used, irrespective of the side from which the fastening means are tightened or undone.

This object is achieved by a tool for machining a workpiece, comprising a tool body, a cutting tool, and fastening means for fastening the cutting tool in a receiving recess of the tool body, the cutting tool having a cutting edge and a cutting-tool through-bore, and the tool body having a tool-body through-bore that opens into the receiving recess, wherein the fastening means comprises a clamping bushing that is provided with an internal thread, and comprises a clamping screw that is provided with an external thread corresponding to the internal thread of the clamping bushing, which are inserted into the cutting-tool bore or into the tool-body bore from opposing sides and screwed together in order to fasten the cutting tool to the tool body, wherein the clamping screw is therefore either inserted through the cutting-tool bore into the tool-body bore and screwed together with the clamping bushing or inserted from the opposing side through the tool-body bore into the cutting-tool bore and screwed together with the clamping bushing, wherein the clamping bushing is screwed directly to the clamping screw, irrespective of whether it is inserted into the cutting-tool bore or into the tool-body bore, and anti-rotation means are provided to prevent the clamping bushing from rotating about its longitudinal axis when being screwed and undone by means of the clamping screw.

The invention in this case is based on the concept of designing the tool and, in particular, the fastening means in such a way that both the clamping bushing and the clamping screw can be inserted into the cutting-tool bore or into the tool-body bore from both sides. Depending on how the fastening means are better accessible in order to undo the fastening means for the purpose of changing the cutting tool and then to re-tighten them, the tool having been clamped into the machine tool, the clamping screw by which the clamping bushing is tightened is either inserted through the cutting-tool bore into the tool-body bore or, alternatively, inserted directly into the tool-body bore from the other side.

Consequently, irrespective of the side on which the clamping screw is located, in each case only one and the same tool is required for tightening or undoing the clamping screw. Further, the fastening means used according to the invention can be produced very easily, and therefore cost-effectively. An internal thread is not provided within the tool-body bore on the tool body itself, as in the case of the conventionally applied solution, merely a simple bore being provided instead. Likewise, in the case of the invention, merely a simple bore is provided on the cutting tool, rather than support wings that are complicated, and therefore expensive, to produce, as in the case of the solution known from WO 2003/074217, such that, in comparison with this cutting tool, the cutting tool used according to the invention, which is subject to frequent wear, can be produced with significantly greater cost-effectiveness.

In a preferred design, provision is made whereby the anti-rotation means have a securing bolt for insertion into a securing bore that is provided in the tool body and that contacts tangentially or intersects the tool-body bore; the securing bolt has a flattened outer portion that, when the securing bolt has been inserted into the securing bore, contacts tangentially or intersects the workpiece-body bore; and the clamping bushing has a corresponding flattened outer portion that, when the clamping bushing has been inserted into the tool body, is located opposite the flattened outer portion of the securing bolt and prevents the clamping bushing from rotating about its longitudinal axis. In the case of this design, reliable anti-rotation of the clamping bushing is realized with very simple means. This securing bore preferably extends perpendicularly relative to the tool-body bore, but in principle can also extend obliquely relative thereto. When in the inserted state, there is preferably a slight play between the flattened outer portion of the securing bolt and the opposing flattened outer portion of the clamping bushing, such that the clamping bushing can still rotate slightly, but rotation to a greater extent is prevented. Insertion and removal of the clamping bushing is thereby facilitated, however. It is also possible, however, for the flattened outer portions to be in direct contact with one another.

It is sufficient, in principle, if a portion of the clamping bushing and/or of the securing bolt is appropriately flattened, these portions being arranged on the clamping bushing, or securing bolt, in such a way that they are opposite one another when in the inserted state. Particularly preferably, however, by reason of easier production, provision is made whereby the securing bolt and/or the clamping bushing has/have the flattened outer portion along an entire longitudinal side or along a large portion of a longitudinal side. Further, provision is made, preferably, whereby the clamping bushing is pre-mounted and remains mounted, even during changing of the cutting tool.

In principle, there are a range of possibilities for preventing the clamping bushing from rotating as the clamping screw is being tightened or undone. In a development, provision is made for this purpose whereby the anti-rotation means and at least a portion of the tool-body bore have a cross-section that prevents rotation of the clamping bushing when it has been inserted into the tool body. This, likewise, constitutes a possibility that is technically simple and that therefore can be realized cost-effectively, which can be applied in addition to the securing bolt described above or as an alternative thereto. In particular, provision is made whereby the anti-rotation means and at least a portion of the tool body have a non-circular cross-section, in particular an oval or angular cross-section, or a cross-section flattened on at least one side. In principle in this case, any form of the cross-section that reliably prevents the clamping bushing from rotating during tightening or undoing can be used.

To enable the clamping screw to be tightened or undone, provision is further made whereby the clamping screw has, at its end face, a tool engagement means, for example a socket for receiving a socket wrench, for example a hex key or a TORX key.

Further, provision is made, in a development, whereby the tool-body bore is arranged in such a way that, when the cutting tool has been inserted into the receiving recess but has not yet been screwed, the bore axis of the tool-body bore extends with a slight offset in relation to the bore axis of the cutting-tool bore. Upon tightening of the clamping screw, the cutting tool is then tightened not only in the direction of the bore axis of the tool-body bore, but also slightly in a direction transverse thereto, preferably in a direction away from the inserted cutting edge and towards the bearing contact surfaces in the receiving recess, in order thus to clamp the cutting tool firmly in the receiving recess.

The present invention further relates to a tool for machining a workpiece, comprising a tool body, a cutting tool, and fastening means for fastening the cutting tool in a receiving recess of the tool body, the cutting tool having a cutting edge and a cutting-tool through-bore, and the tool body having a tool-body through-bore that opens into the receiving recess, wherein the fastening means comprises a clamping bushing that is provided with an internal thread, and comprises a clamping screw that is provided with an external thread corresponding to the internal thread of the clamping bushing, which are inserted into the cutting-tool bore or into the tool-body bore from opposing sides in order to fasten the cutting tool to the tool body, the clamping bushing is screwed directly to the clamping screw, irrespective of whether it is inserted into the cutting-tool bore or into the tool-body bore, and anti-rotation means are provided to prevent the clamping bushing from rotating about its longitudinal axis when being screwed and undone by means of the clamping screw.

It is to be mentioned that the features of the present invention that are described above or to be described in the following can be also applied, not only in the specifically stated combinations, but also in any other combinations.

BRIEF DESCRIPTION OF THE DRAWINGS

The invention is explained in more detail below with reference to exemplary embodiments shown in the drawings, wherein.

DESCRIPTION OF A PREFERRED EMBODIMENT

Figure 1:
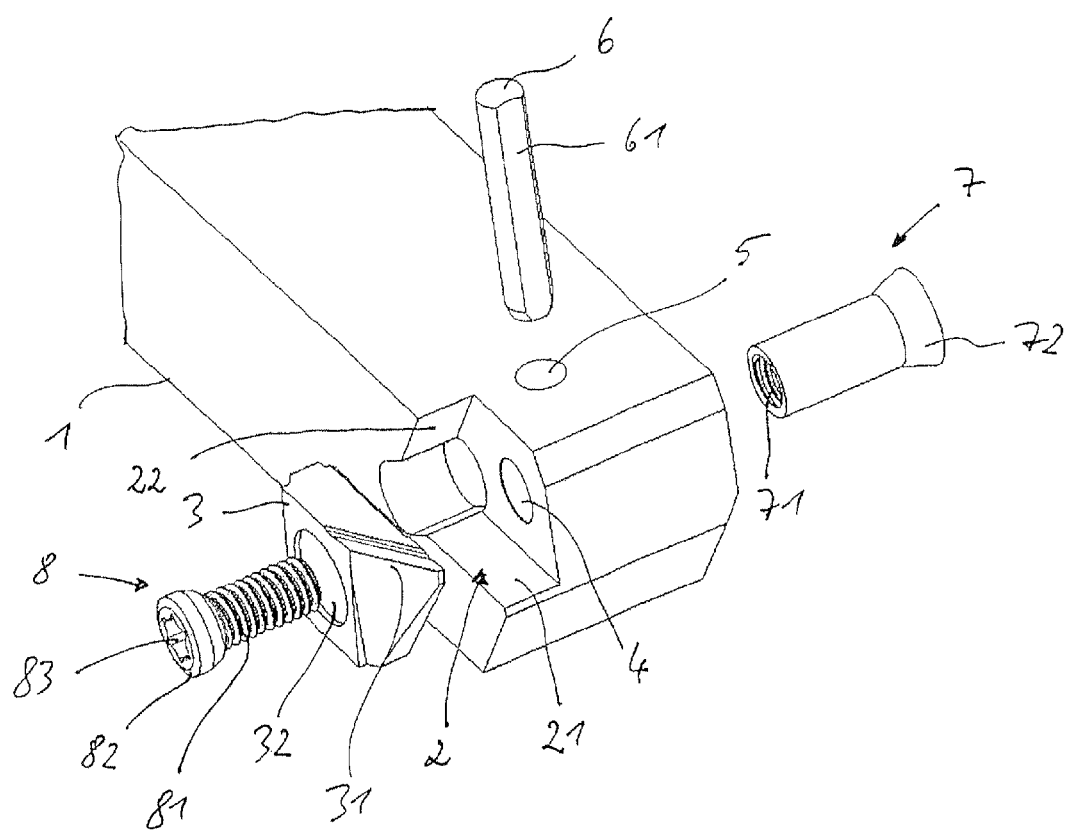
FIG. 1 shows a first design of the tool according to the invention, in a disassembled state.

FIG. 1 shows a first design of the tool according to the invention, in a disassembled state. It shows the tool body 1, provided at the front lateral end of which there is a receiving recess 2 for receiving a cutting tool 3. A tool-body bore 4, which opens into the receiving recess 2, is provided transversely in the front region of the tool body 1. Further, a securing bore 5, for receiving a securing pin, or securing bolt, 6, is arranged transversely relative to the tool-body bore 4, extending at right angles thereto and intersecting the tool-body bore 4 in the case of this exemplary embodiment.

The cutting tool 3, being, in the present case, a reversible cutting bit having two cutting edges 31 (the rear cutting edge is not visible in this representation), has a cutting-tool through-bore 32 in its center.

According to the invention, a clamping bushing 7 and a clamping screw 8 are provided as fastening means for fastening the cutting tool 3 in the receiving recess 2. The clamping bushing 7 in this case has an internal thread 71 and a countersunk head 72. The clamping screw 8 has an external thread 81 that corresponds with the internal thread 71 of the clamping bushing 7, and likewise has a countersunk head 82, the design of which can be very similar or identical to that of the countersunk head 72. Further, a tool engagement means 83, for example a hex socket for receiving a hex key for turning the clamping screw 8, is provided on the end face.

Figure 2:
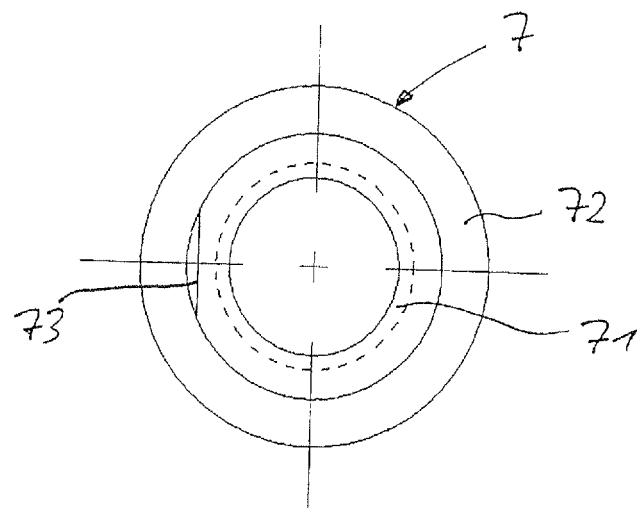
FIG. 2 shows a clamping bushing used according to the invention, in cross-section.

The tool-body bore 4 and the cutting-tool bore 32 are designed in such a way that the clamping bushing 7 can be inserted into and can fit into both bores. In order to fasten the cutting tool 3 to the tool body 1, the clamping bushing 7 is first inserted into the tool-body bore 4, on the side that faces away from the receiving recess 2. Preferably, in this case, the securing bolt 6 is premounted and already inserted into the securing bore 5, which is designed in such a way that the securing bolt 6 does not fall out by itself. The securing bolt 6 serves as an anti-rotation means for the clamping bushing 7. For this purpose, the securing bolt 6 has a flattened longitudinal side 61, which, in the inserted state, faces towards the tool-body bore 4 and preferably intersects the latter. The clamping bushing 7 has a corresponding flattened portion 73 (cf. the cross-section of the clamping bushing 7 shown in FIG. 2), which, in the inserted state, is in contact with the flattened longitudinal side 61 of the securing bolt 6, or is separated from this longitudinal side only by a small air gap, whereby the clamping bushing 7 is prevented from being able to rotate to a greater extent about its longitudinal axis when the securing bolt 6 has been inserted into the securing bore 5, such that, at most, a slight rotation is possible.

The cutting tool 3 is then inserted into the receiving recess 2, and the clamping screw 8 is inserted through the cutting-tool bore 32 and into the tool-body bore 4, where it is inserted into the clamping bushing 7. The clamping screw 8 is then screwed to the clamping bushing 7 by means of an auxiliary tool (not shown). Preferably, the cutting tool 3 is thereby moved slightly further into the receiving recess 2, i.e. towards the bearing contact surfaces 21 and 22, since the tool-body bore 4 and the cutting-tool bore 32 are preferably located slightly eccentrically relative to one another whilst the clamping screw 8 is not yet firmly screwed to the clamping bushing 7.

Figure 3:
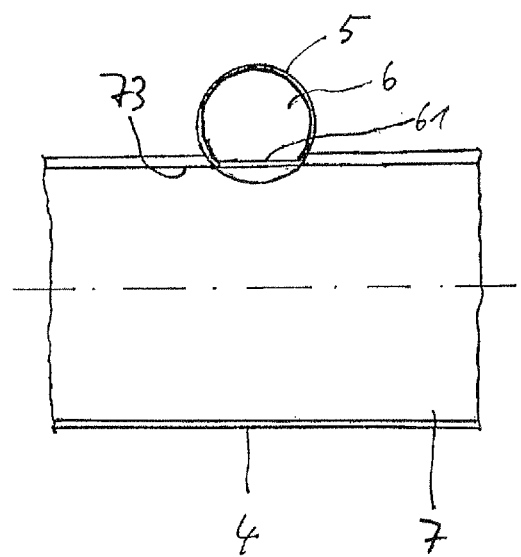
FIG. 3 shows the tool-body bore and the clamping bushing in longitudinal section, and the securing bore in cross-section.

FIG. 3 shows an enlargement of the tool-body bore 4, and a portion of the clamping bushing 7 in longitudinal section, and the securing bore 5 in cross-section. It can be seen therein that the securing bore 5 intersects the tool-body bore 4, and that the flattened outer portion 61 of the securing bolt 6 also projects into the tool-body bore 4. Further, it can be seen that the flattened outer portion 61 of the securing bolt 6 and the flattened outer portion 73 of the clamping bushing 7 are not directly in contact when in the inserted position, but are separated by a small air gap, such that the clamping bushing 7 still has some play, to facilitate its insertion and removal.

Figure 4:
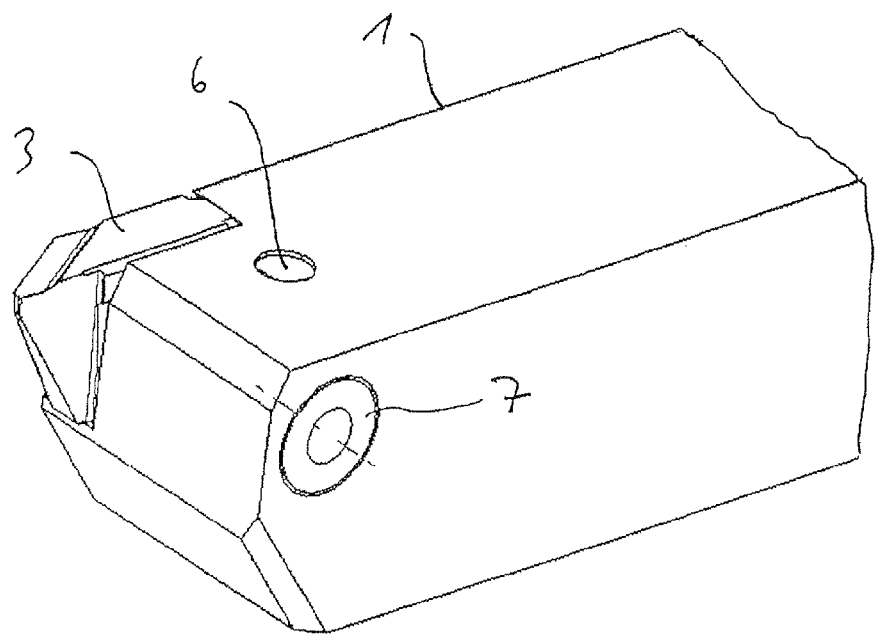
FIG. 4 shows a first side view of the first design of the tool according to the invention, in an assembled state.
Figure 5:
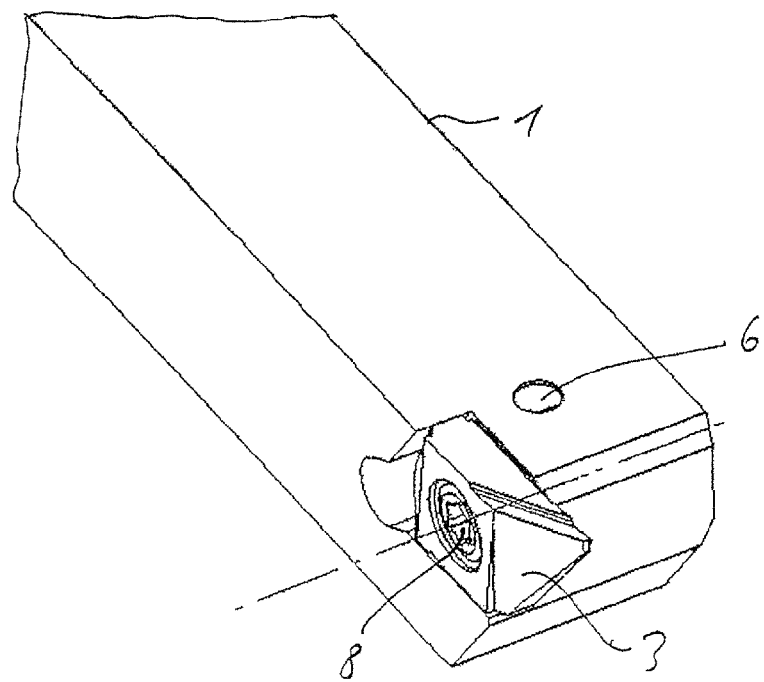
FIG. 5 shows a second side view of the first design of the tool according to the invention in an assembled state.

A first side view of the first design of the tool according to the invention is shown in FIG. 4, and a second side view thereof is shown in FIG. 5.

Figure 6:
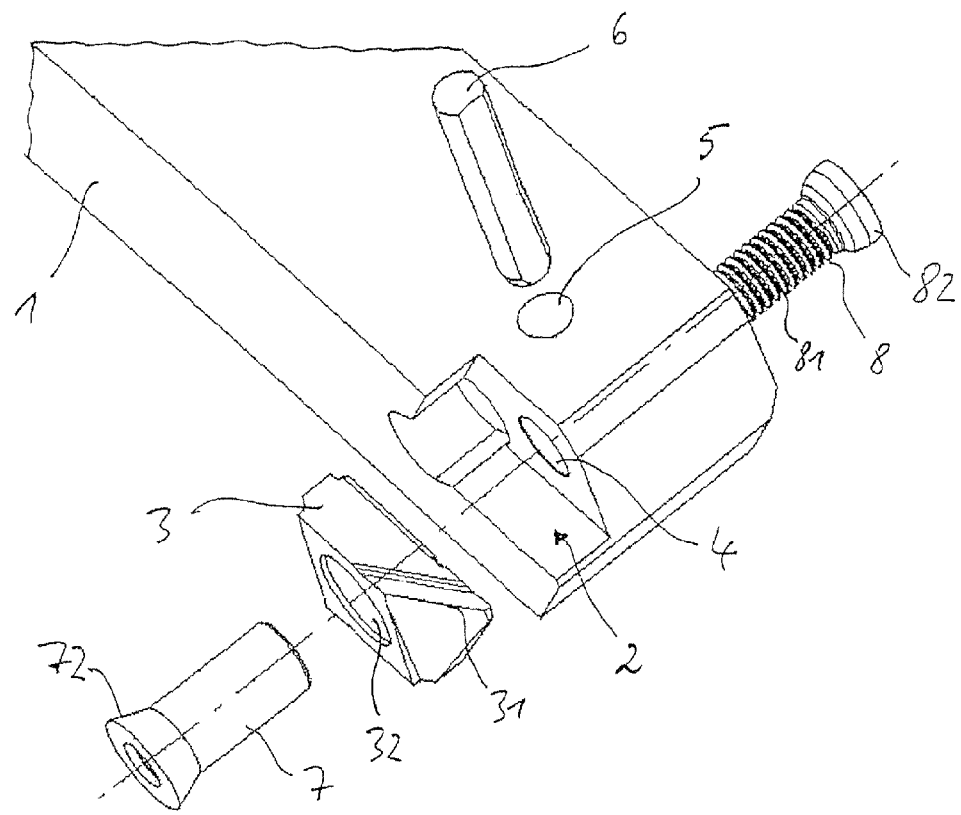
FIG. 6 shows a second design of the tool according to the invention, in a disassembled state.

The first design of the tool according to the invention is used when, for the purpose of changing the cutting tool 3, the tool is accessible from the side on which the cutting tool 3 is arranged, since the auxiliary tool does have to engage in the tool engagement means 83 of the clamping screw 8 in order to undo the latter. However, if there is not sufficient space on this side, as may quite often be the case, particularly in the case of automated longitudinal turners, there is the possibility, alternatively, of using the same components of the tool in a second design, as shown for the disassembled state in FIG. 6. In this figure, parts that are the same are denoted by the same references.

As shown clearly, the clamping bushing 7 is now arranged on the side of the cutting tool 3 and engages, through the cutting-tool bore 32, into the tool-body bore 4. From the other side, the clamping screw 8 engages in the tool-body bore 4 and is screwed to the clamping bushing 7 from this other side by means of the auxiliary tool (not shown).

The tool according to the invention thus offers the possibility of using the fastening elements variably and from differing sides, in order thereby to take account of the possibilities that exist in respect of accessibility in the case of the tool having been clamped into a machine tool. The fastening means in this case are of very simple design, and consequently can be produced cost-effectively. Moreover, the tool body itself and the cutting tool do not need to have any special means but, in order to be used with the fastening means according to the invention, are merely provided with very simple bores.

Figure 7:
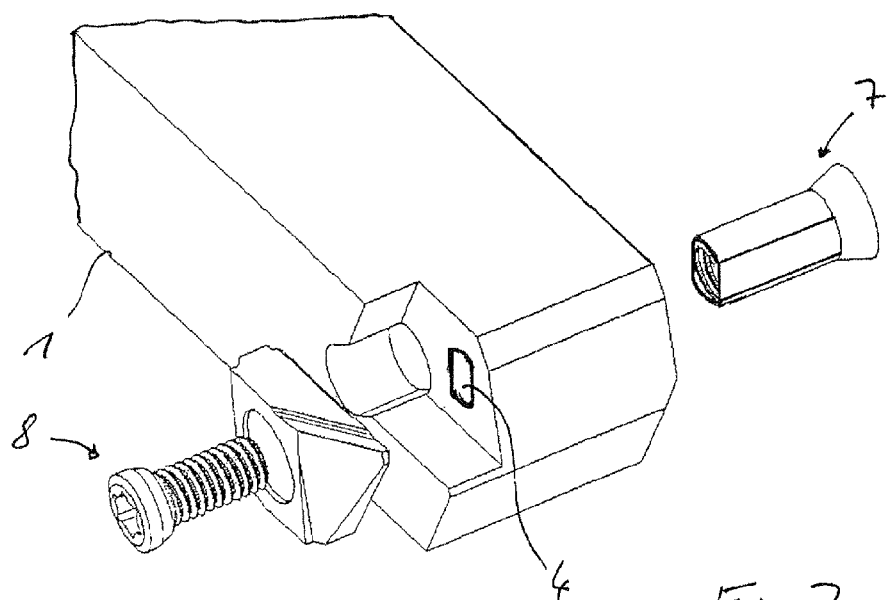
FIG. 7 shows a third design of the tool according to the invention, in a disassembled state.

A further design of a tool according to the invention is shown in FIG. 7. There, in particular, the anti-rotation means is realized differently. Instead of the securing bolt 6 shown in FIGS. 1 and 5, in the case of this design the tool-body bore 4 and the clamping bushing 7 are designed differently. Thus, in the case of this design, the latter have a cross-section other than the circular shape. In the case of the design shown, the cross-section of the tool-body bore 4 and that of the clamping bushing 7 are flattened equally on two opposing sides, and such that they match one another. Consequently, the clamping bushing 7 can only be introduced in one position, or in two differing positions, into the tool-body bore 4, and is fixedly seated there, locked against rotation. An additional securing bolt can also be provided, as explained in the designs shown in FIGS. 1 to 5 but, in principle, is not necessary. It is understood that cross-section of the tool-body bore 4 and of the clamping bushing 7 can also be of a different form, provided that the clamping bushing 7 is reliably prevented from rotating in the tool-body bore 4.

The present invention is not limited to the designs shown. A multiplicity of further variations are conceivable. In particular, the invention is not limited to application in the case of a longitudinal turning tool, as shown in the figures. It is understood that this invention can be applied with other tools. Moreover, the type, size and arrangement of the cutting tool are no more limiting of the protective scope of the present invention than are the type, size and design of the tool body.

Therefore, what is claimed is:

1. A tool for machining a workpiece, comprising:
    a tool body,
    a cutting tool,
    a fastener, wherein the fastener fastens the cutting tool in a receiving recess of the tool body, the cutting tool having a cutting edge and a cutting-tool through-bore, and the tool body having a tool-body through-bore that opens into the receiving recess,
        wherein the fastener comprises a clamping bushing that is provided with a clamping bushing internal thread, and comprises a clamping screw that is provided with a clamping screw external thread corresponding to the clamping bushing internal thread,
        wherein the clamping bushing and the clamping screw are configured for the clamping bushing to be inserted from a first side of the tool into the cutting-tool bore and the clamping screw to be inserted from a second side of the tool opposite the first side into the tool-body bore and the clamping bushing and the clamping screw to be screwed together in order to fasten the cutting tool to the tool body,
        wherein the clamping bushing and the clamping screw are configured for the clamping bushing to be inserted from the second side into the tool-body bore and the clamping screw to be inserted from the first side into the cutting-tool bore and the clamping bushing and the clamping screw to be screwed together in order to fasten the cutting tool to the tool body,
        wherein when the clamping bushing and the clamping screw are screwed together in order to fasten the cutting tool to the tool body the clamping bushing is screwed directly to the clamping screw, irrespective of whether the clamping bushing is inserted into the cutting-tool bore or into the tool-body bore; and an anti-rotation means to prevent the clamping bushing from rotating about a longitudinal axis of the clamping bushing when the clamping screw is being screwed to the clamping bushing and when the clamping screw is being unscrewed from the clamping bushing.

2. The tool as claimed in claim 1, wherein the anti-rotation means has a securing bolt for insertion into a securing bore that is provided in the tool body and contacts the tool-body bore tangentially or intersects the tool-body bore, wherein the securing bolt has a first flattened outer portion, and the clamping bushing has a second flattened outer portion, wherein when the securing bolt is inserted into the securing bore and contacts the tool-body bore tangentially or intersects the tool-body bore when the clamping bushing is inserted into the tool body, the second flattened outer portion opposite the first flattened outer portion, the securing bolt prevents the clamping bushing from rotating about the longitudinal axis of the clamping bushing.

3. The tool as claimed in claim 2, wherein the securing bore extends perpendicularly relative to the tool-body bore.

4. The tool as claimed in claim 2, wherein the securing bolt has the first flattened outer portion along an entire first longitudinal side of the securing bolt.

5. The tool as claimed in claim 1, wherein the anti-rotation means comprises the clamping bush having a first cross-section shape and at least a portion of the tool-body bore having a second cross-section shape such that the first cross-section shape and the second cross-section shape prevents rotation of the clamping bushing when the clamping bushing has been inserted into the tool-body bore.

6. The tool as claimed in claim 5, wherein the first cross-section shape is non-circular and the second cross-section shape is non-circular.

7. The tool as claimed in claim 1, wherein the clamping screw has, at an end face of the clamping screw, a tool engagement means.

8. The tool as claimed in claim 1, wherein the tool-body bore is arranged in such a way that, when the cutting tool has been inserted into the receiving recess but has not yet been screwed down, a bore axis of the tool-body bore extends with a slight offset in relation to a bore axis of the cutting-tool bore.

9. A tool for machining a workpiece, comprising:
a tool body;
a cutting tool;
a fastener, wherein the fastener fastens the cutting tool in a receiving recess of the tool body, the cutting tool having a cutting edge and a cutting-tool through-bore, and the tool body having a tool-body through-bore that opens into the receiving recess,
wherein the fastener comprises a clamping bushing that is provided with a clamping bushing internal thread, and comprises a clamping screw that is provided with a clamping screw external thread corresponding to the clamping bushing internal thread,
wherein the clamping bushing and the clamping screw are configured for the clamping bushing to be inserted from a first side of the tool into the cutting-tool bore and the clamping screw to be inserted from a second side of the tool opposite the first side into the tool-body bore and the clamping bushing and the clamping screw to be screwed together in order to fasten the cutting tool to the tool body,
wherein the clamping bushing and the clamping screw are configured for the clamping bushing to be inserted from the second side into the tool-body bore and the clamping screw to be inserted from the first side into the cutting-tool bore and the clamping bushing and the clamping screw to be screwed together in order to fasten the cutting tool to the tool body,
wherein when the clamping bushing and the clamping screw are screwed together in order to fasten the cutting tool to the tool body the clamping bushing is screwed directly to the clamping screw; and a securing bolt for insertion into a securing bore that is provided in the tool body and contacts the tool-body bore tangentially or intersects the tool-body bore, wherein the securing bolt has a first flattened outer portion and the clamping bushing has a second flattened outer portion, wherein when the securing bolt is inserted into the securing bore and contacts the tool-body bore tangentially or intersects the tool-body bore when the clamping bushing is inserted into the tool body, the second flattened outer portion opposite the first flattened outer portion, the securing bolt prevents the clamping bushing from rotating about a longitudinal axis of the clamping bushing when the clamping screw is being screwed to the clamping bushing and when the clamping screw is being unscrewed from the clamping bushing.

10. The tool as claimed in claim 9, wherein the tool-body bore is arranged in such a way that, when the cutting tool has been inserted into the receiving recess but has not yet been screwed down, a bore axis of the tool-body bore extends with a slight offset in relation to a bore axis of the cutting-tool bore.

11. The tool as claimed in claim 9, wherein the clamping screw has, at an end face of the clamping screw, a tool engagement means.

12. A tool for machining a workpiece, comprising:
a tool body;
a cutting tool; and
a fastener, wherein the fastener fastens the cutting tool in a receiving recess of the tool body, the cutting tool having a cutting edge and a cutting-tool through-bore, and the tool body having a tool-body through-bore that opens into the receiving recess,
wherein the fastener comprises a clamping bushing that is provided with a clamping bushing internal thread, and comprises a clamping screw that is provided with a clamping screw external thread corresponding to the clamping bushing internal thread,
wherein the clamping bushing and the clamping screw are configured for the clamping bushing to be inserted from a first side of the tool into the cutting-tool bore and the clamping screw to be inserted from a second side of the tool opposite the first side into the tool-body bore and the clamping bushing and the clamping screw to be screwed together in order to fasten the cutting tool to the tool body,
wherein the clamping bushing and the clamping screw are configured for the clamping bushing to be inserted from the second side into the tool-body bore and the clamping screw to be inserted from the first side into the cutting-tool bore and the clamping bushing and the clamping screw to be screwed together in order to fasten the cutting tool to the tool body,
wherein when the clamping bushing and the clamping screw are screwed together in order to fasten the cutting tool to the tool body the clamping bushing is screwed directly to the clamping screw;
wherein the clamping bush has a first cross-section shape and at least a portion of the tool-body bore has a second cross-section shape such that the first cross-section shape and the second cross-section shape prevents the clamping bushing from rotating about a longitudinal axis of the clamping bushing when the clamping screw is being screwed to the clamping bushing and when the clamping screw is being unscrewed from the clamping bushing.

13. The tool as claimed in claim 12, wherein the tool-body bore is arranged in such a way that, when the cutting tool has been inserted into the receiving recess but has not yet been screwed down, a bore axis of the tool-body bore extends with a slight offset in relation to a bore axis of the cutting-tool bore.

14. The tool as claimed in claim 12, wherein the clamping screw has, at an end face of the clamping screw, a tool engagement means.

15. The tool as claimed in claim 2, wherein the clamping bushing has the second flattened outer portion along an entire longitudinal side of the clamping bushing.

16. The tool as claimed in claim 4, wherein the clamping bushing has the second flattened outer portion along an entire second longitudinal side of the clamping bushing.

17. The tool as claimed in claim 2, wherein the securing bolt has the first flattened outer portion along a large portion of a first longitudinal side of the securing bolt.

18. The tool as claimed in claim 2, wherein the clamping bushing has the second flattened outer portion along a large portion of a longitudinal side of the clamping bushing.

19. The tool as claimed in claim 5, wherein the first cross-section shape and the second cross-section shape are selected from the group consisting of: oval, angular, and a cross-section flattened on at least one side.

\* \* \* \* \*